Oct. 31, 1950 L. O. FUNDINGSLAND 2,528,270
ROTATABLE ROD WEEDER ATTACHMENT FOR CHISEL PLOWS
Filed Aug. 28, 1948 4 Sheets-Sheet 2
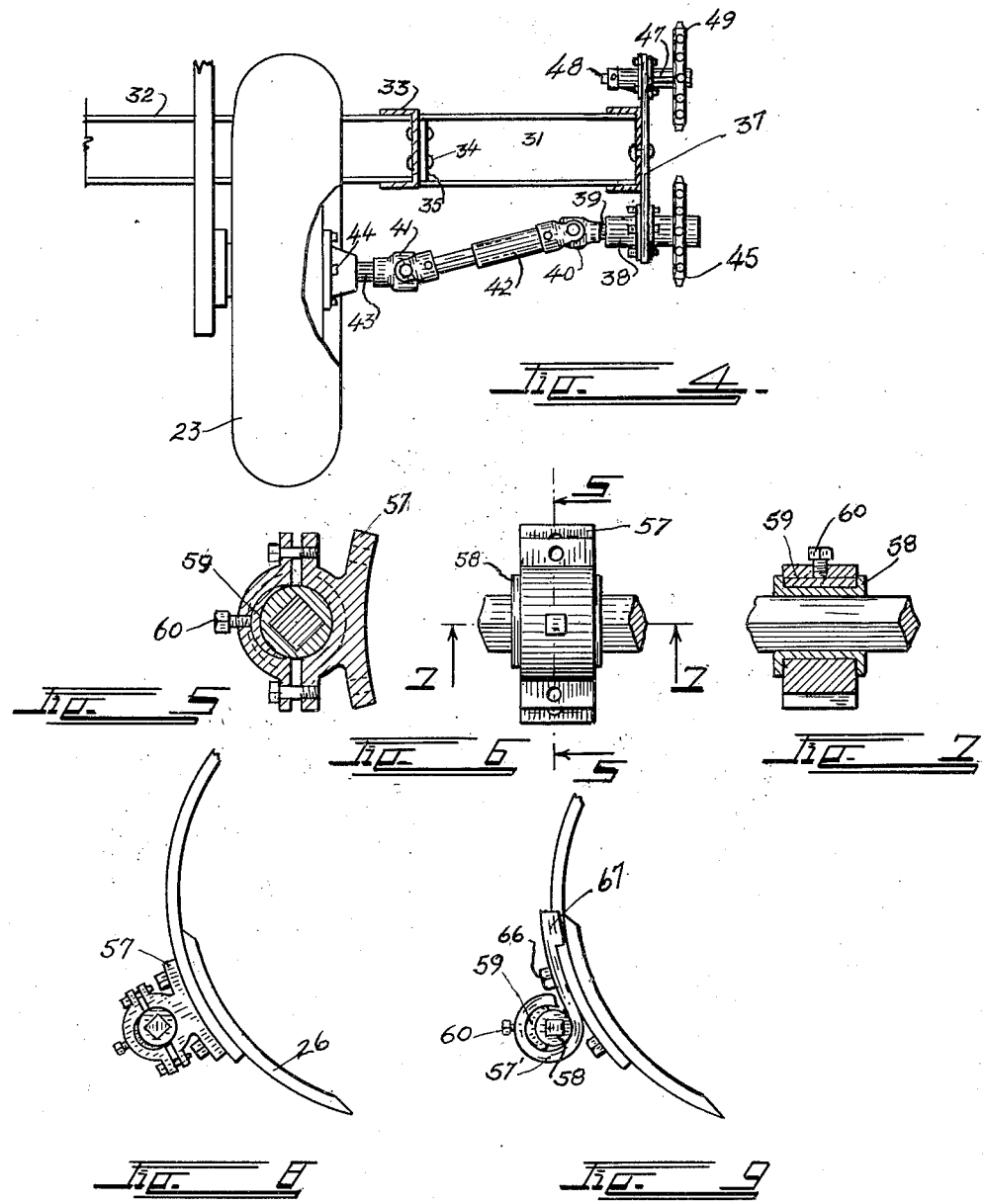
INVENTOR.
L. O. FUNDINGSLAND
BY Martin E. Anderson
ATTORNEY

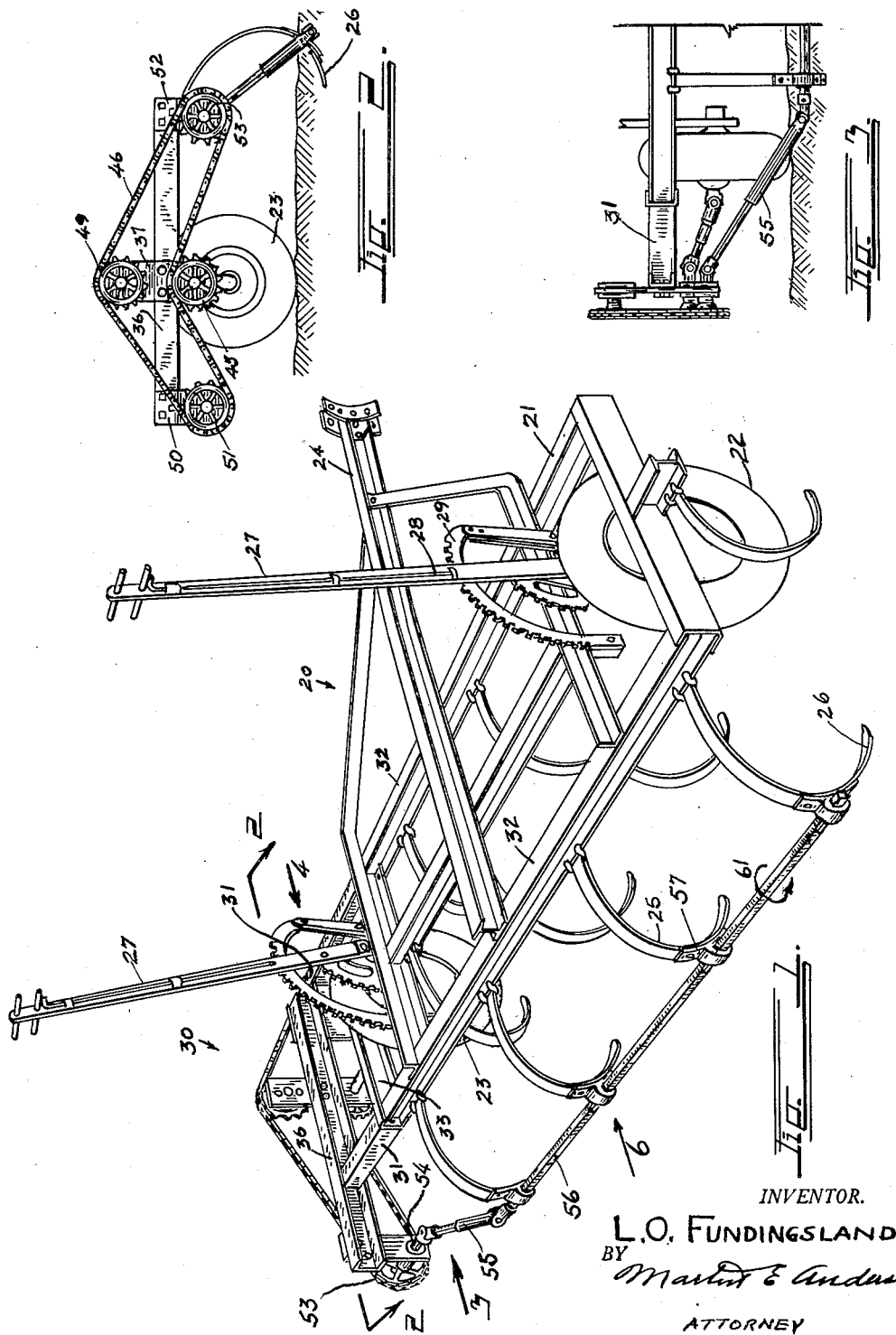

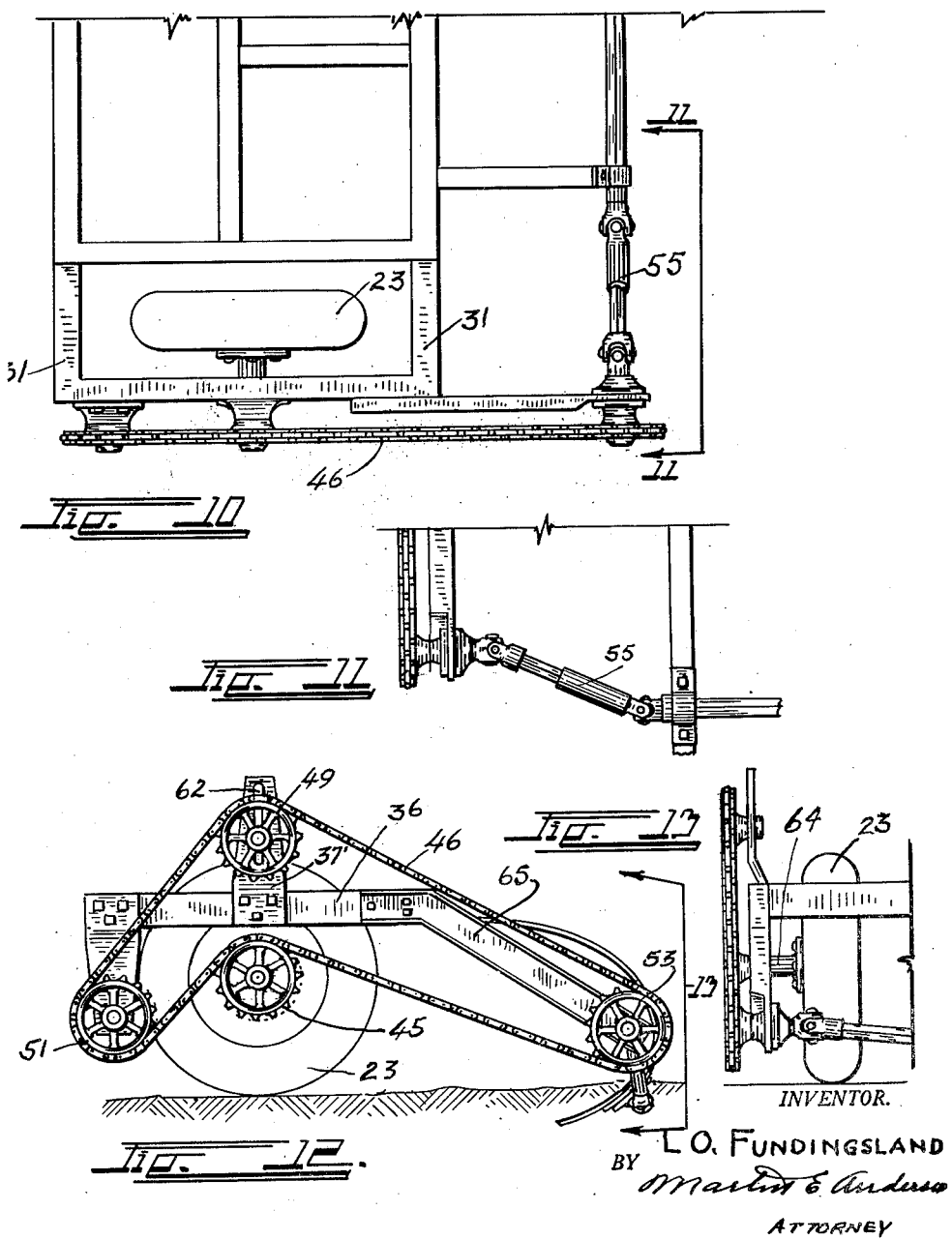

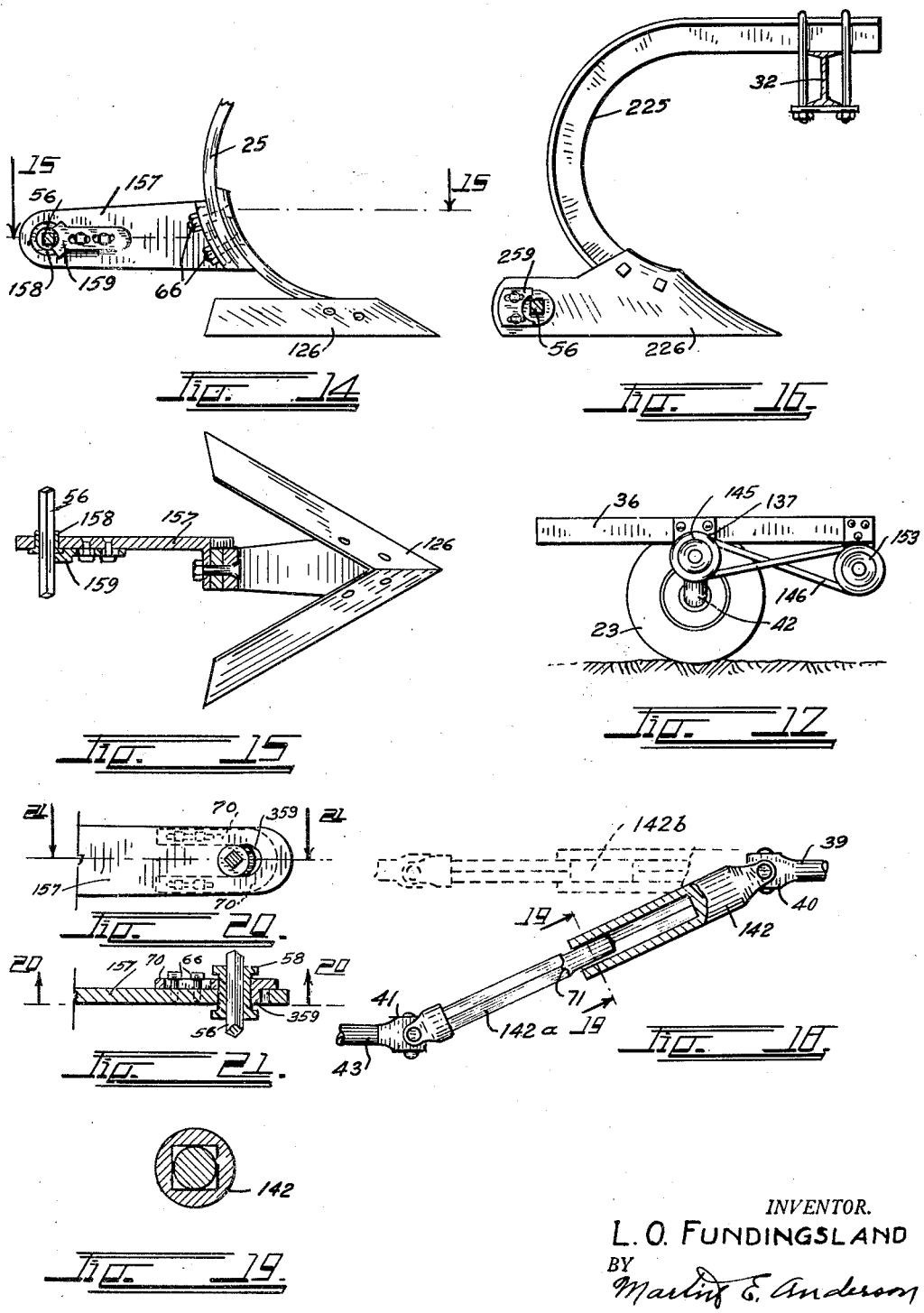

Patented Oct. 31, 1950

2,528,270

UNITED STATES PATENT OFFICE 2,528,270

ROTATABLE ROD WEEDER ATTACHMENT FOR CHISEL PLOWS

Laurence O. Fundingsland, Burlington, Colo.

Application August 28, 1948, Serial No. 46,694

8 Claims. (Cl. 97—42)

This invention relates to agricultural implements and more particularly to a rod weeder attachment for chisel plows.

It is well recognized that the moisture content in fallow ground may be conserved and its condition thus improved by removing the weeds which rob the soil of moisture. In the prior art this has been achieved by various instrumentalities, one of the more effective of which is a class of devices commonly known as rod weeders. These weeders are usually constructed with a wheel supported frame which may be drawn by a tractor and which carry a rod, usually square in cross section, which rotates below the surface of the ground, this rod engaging the weeds which are torn by their roots from the ground. In some weeders of this class the weeder rod is arranged behind a plurality of plows.

These devices, while well adapted for this particular purpose, are not designed or intended for any other purpose and the rod weeder feature could not be eliminated except by extensive changes in such machines. It has been discovered that a conventional chisel plow is well adapted to prepare the soil ahead of the rotary rod and by constructing the rod weeder as a removable attachment for a chisel plow, the chisel plow may be used for its normal purpose or it may be converted into an effective rod weeder by merely adding the attachment of this invention. This reduces the overall cost of the equipment necessary to both chisel and rod weed since it eliminates one machine. When the chisel plow and attachment are used together one operation in the preparation of the ground is eliminated. Also, chisel plows are in wide use and for a nominal cost as compared to the cost of a complete rod weeder, existing chisel plows may be converted into effective rod weeders by merely attaching thereto this invention.

One of the principal objects of the invention is to provide an attachment for conventional chisel plows which may be attached thereto to thus convert such plows into rod weeders.

Another object is to provide an attachment for a chisel plow which permits the chisel plow to operate in its normal manner and also remove weeds from the soil.

Another object is to construct the attachment in such manner that it may be quickly and easily attached to or detached from the chisel plow so that the chisel plow may be used with or without the attachment, as desired.

The above and other objects that may become apparent as the description proceeds are obtained by means of a construction and an arrangement of parts that will now be described in detail and for this purpose reference will be had to the accompanying drawing in which the invention has been illustrated in its preferred form, and in which:

Figure 1 is a perspective view of one form of the invention showing a conventional chisel plow to which the attachment has been applied;

Figure 2 is an end elevation taken on line 2—2, Figure 1;

Figure 3 is a side elevation taken from the rear in the region and direction of arrow 3, Figure 1;

Figure 4 is a similar view but taken from the front in the direction of arrow 4, certain parts being broken away and others shown in section;

Figure 5 is a cross section of a bearing structure taken on line 5—5, Figure 6;

Figure 6 is an elevation taken in the direction of arrow 6, Figure 1;

Figure 7 is a section taken on line 7—7, Figure 6;

Figure 8 is an end elevation of the bearing of Figures 5 to 7 shown attached to a chisel;

Figure 9 is a side elevation of an alternative form of bearing;

Figure 10 is a plan view of a second form of rod weeder attachment;

Figure 11 is a side elevation taken on line 11—11, Figure 10;

Figure 12 is an end elevation of Figure 10;

Figure 13 is a side elevation taken on line 13, Figure 12;

Figure 14 is an elevation of an alternative form of plow and weeder rod bearing structure;

Figure 15 is a section taken on line 15—15, Figure 14;

Figure 16 is an elevation of another form of plow and plow support;

Figure 17 is an elevation of an alternative weeder rod drive mechanism;

Figure 18 is an elevation, partly in section, of an alternative form of drive coupling;

Figure 19 is a section taken on line 19—19, Figure 18;

Figure 20 is an alternative form of bearing structure taken on line 20—20, Figure 21; and Figure 21 is a section taken on line 21—21, Figure 20.

Referring in detail to the drawing, there is shown in Figure 1 a chisel plow 20 having a frame 21 supported near its ends by wheels 22 and 23, the plow 20 being drawn by a tongue 24 which may be attached at its end to any suitable draught instrumentality, such as a tractor. A plurality of pendants 25 are attached to the frame and carry at their ends chisels 26 which are adapted to move below the surface of the ground as shown in Figure 2. Levers 27 are provided on frame 21, each of which carries a latch 28 engageable in notches on a quadrant 29, movement of these levers adjusting the position of wheels 22, 23 with respect to the frame to thus regulate the depth to which chisels 25 enter the ground. The chisel plow 20 has been described only in general terms because plows of this type are well known in the art and the details thereof form no part of this invention. The details of the wheel positioning means in this and subsequent figures to be described likewise form no part of the invention, and have been omitted to simplify the disclosure, but it is to be understood that such positioning means may be those provided on the well-known Graham-Hoeme or Jeoffroy chisel plows as exemplified by the patent to Jeoffroy, No. 2,082,163, dated June 1, 1937.

The rod weeder attachment is generally indicated at 30 and has a pair of frame members 31, 31 which form an extension of frame members 32, 32 of the chisel plow and are secured to an end frame 33 thereof by bolts 34, as shown in Figure 4, these bolts passing through suitable ears 35 on frames 31. It is to be understood that the frame members may be constructed from other structural shapes and be secured to the chisel plow in any other manner desired, the particular structure described being intended as illustrative only.

Frame members 31, 31 are joined to another frame member 36 in any suitable manner such as by welding, rivets, or the like, and member 36 supports certain of the operative parts of a power take-off device to be now described. A bracket 37 is secured to frame member 36 and has ends projecting on opposite sides of frame 36. To the lower end is secured a bearing 38 which supports for rotation therein, a shaft 39, as best shown in Figure 4. Shaft 39 is connected at one end to wheel 23 by universal joints 40, 41, extensible propeller shaft 42 and shaft 43, the latter being connected to the wheel 23 in any suitable manner, such as by an adapter hub 44 which may be secured to wheel 23. The shafting just described provides a flexible connection between wheel 23 and shaft 39 which permits frame 32 to be adjusted relative to wheels 22, 23, thus forming a driving connection between shafts 43 and 39 in all relative positions thereof.

A sprocket 45 is secured to the outer end of shaft 39 and engages a chain 46 which drives the weeder rod hereinafter described.

A bearing 47 is secured to the upper end of bracket 37 and a shaft 48 is rotatably supported therein which carries an idler sprocket 49. Another bracket 50 is secured to one end of frame 36 and similarly supports an idler sprocket 51. At the other end of frame 36 another bracket 52 is provided which similarly journals a sprocket 53 thereon. The chain 46 is trained about sprockets 45, 53, 49, and 51 in the manner shown in Figure 2. As the chisel plow moves forward, that is to the left as viewed in Figure 4, wheel 23 will rotate counterclockwise but sprocket 53 will rotate clockwise for a purpose to be subsequently described.

Sprocket 53 is secured to a short shaft 54 journaled in bracket 52 and the inner end of shaft 54 is secured to one end of a propeller shaft 55 constructed in the same manner as extensible propeller shaft 40, 41, 42. The other end of shaft 55 is secured to weeder rod 56, this shaft being square or otherwise non-circular in cross section.

Journals 57 are secured to each of the pendants or chisels by suitable bolts which may pass through existing holes in the chisels or by any other convenient securing means. Journals 57, as shown in Figures 5, 6, and 7, have spools 58 rotatably supported therein, the bore of these spools conforming to the cross sectional shape of the weeder rod and the outside thereof being cylindrical. Journals 57 have non-circular bores, as best shown in Figures 5 and 7, and a plate 59 is provided in each which may be moved by a screw 60 to compensate for wear between the spool and journal.

It will now become apparent that as the chisel plow 20 advances over the ground the chisels 25 perform their normal function and weeder rod 56 follows the chisels rotating within the ground and removing the weeds therefrom. The direction of rotation of the weeder rod is as indicated by arrow 61 in Figure 1 so that a forward corner of rod 56 engages the weed and lifts it upwardly toward the surface of the ground, thereby pulling the weed by its roots from the ground.

In Figures 10 to 13 is shown another form of the invention. Frame members 31 and 36 are the same as the form previously described, but bracket 37' extends on only one side of the frame as shown in Figure 12. This bracket carries a sprocket which may be adjusted vertically in slot 62 by any suitable supporting shaft, or the like, movable in the slot and fixed therein at a desired position by any suitable means which will be apparent to those skilled in the art. A hub 64 is secured to wheel 23 and affixed to the outer end thereof is a sprocket 45. The flexible connection 40, 41, 42 previously described is then eliminated and in its stead slot 62 is provided in which sprocket 49 may be adjusted to adjust the chain 46 when wheels 22, 23 are adjusted with respect to frame 20. This form of the invention has the advantage of eliminating one of the extensible propeller shafts by substituting a somewhat simplified drive, but still retaining the feature of adjustability in the drive mechanisms necessary when frame 32 is adjusted relative to the wheels. This form of the invention also differs in that a depending and rearwardly extending frame 65 is provided which places sprocket 53 somewhat more in alignment with the weeder rod, thus reducing the angularity of propeller shaft 55, with respect to the weeder rod and the weeder rod drive sprocket.

Figure 9 shows an alternative form of weeder rod bearing structure. The bearing structure 57' is formed of flat material with one end thereof curled to a generally circular form which receives wear plate 59 in a similar manner as previously described. The other end of bearing 57' is secured to the pendant or chisel by a single bolt 66 and an ear 67 is provided on each side thereof to aid in maintaining proper alignment of the bearing on its mounting. It is apparent that these ears could be eliminated and bearing 57' secured by two bolts, if desired, or in any manner as will occur to those skilled in the art.

While the weeder rod has been illustrated attached to the rear set of chisels, it is apparent that it could be attached to a set of the forward chisels since extensible propeller shaft will effect a drive to the bar no matter where located, so long as within its range of adjustability. When mounted as shown in Figure 1, the weeder rod tends to level the ground, whereas, if mounted on a forwardly set of chisels, the last set of chisels would leave their normal furrows. Thus, by choice of the set of chisels to which the weeder rod is attached, different plowing and weeding effects may be achieved.

Also, while the drive attachment has been illustrated attached to the left side of the chisel plow in Figure 1, it is apparent that it could be constructed to be attached to the right side. With a right and left drive on two chisel plows, it is apparent that they could be attached together at their ends to form a chisel plow of a width double to that shown. Also, two or more chisel plows could be joined together at their ends and the weeder rod constructed of such a length that it would extend the entire length of the coupled chisel plows, the drive being taken from one end only.

In Figures 14 and 15 is shown an alternative form of plow 126 which may be attached to pendant 25 of the chisel plow. Plow 126 has rearwardly sweeping blades, sometimes referred to as a "duck foot." When a plow of this type is used it may be desirable, and in some cases is necessary, to mount weeder rod 56 considerably to the rear of pendant 25. This is achieved by suitable brackets 157 which are secured to pendants 25 by bolts 66. The holes in brackets 157 through which bolts 66 pass are preferably elongated so that the brackets may be secured to pendants 25 in various positions of elevation with respect to the ground for the purpose of effecting various positions of adjustment of the weeder rod with respect to the plows and also for the purpose of properly aligning the weeder rod bearings. The ends of brackets 157 are suitably apertured to receive the weeder rod spools 158, which like spool 58, have bores to fit the weeder rod and a circular periphery. To compensate for wear between the spool and bracket a lug or wear shoe 159 is provided which may overlap the rim of the spool, as shown in Figure 15, to thus retain the spool on bracket 157. This wear shoe also has elongated holes through which its securing bolts pass so that it may be adjusted relative to bracket 157. The type and shape of plow 126 may, of course, be varied and the length and shape of bracket 157 be such that weeder rod 56 is positioned as desired with respect to pendant 25 or plow 126.

In Figure 16 is shown an alternative form of pendant 225 which may be attached at one end thereof to chisel plow frame 32. This pendant may be formed from a T section, or other section having a web, to provide additional stiffness against bending. This pendant may carry any suitable plow 226 which includes therein a weeder rod bearing and wear shoe 259 similar to wear shoe 159. This type of plow, as is apparent, eliminates bearings 57 or brackets 157 since the weeder rod bearing is part of the plow 226. While the pendant 226 is shown attached to the top of frame 32 by U bolts, or the like, it is apparent that it may be also attached to the bottom of the frame.

It will now become apparent from the description of Figure 14 to 16 that a conventional chisel plow may be altered with respect to its plow structure and the rod weeder attachment may still be easily adapted thereto. This further increases the versatility of a conventional chisel plow since it may be converted into various forms of rod weeders, varying with respect to the particular plow which enters the ground ahead of the weeder rod.

In Figure 17 is shown an alternative form of drive mechanism for the weeder rod. Frame 36 and drive 42 are the same as shown in Figure 2, but instead of employing sprockets 45, 53, and chain 46, pulleys 144, 153, and belt 146 are substituted. This belt is crossed so that the weeder rod rotates in a direction opposite to wheel 23. The belt may be V-shaped or flat and a plurality of juxtaposed pulleys and belts may be employed where power transmission requirements are such that a single belt would not suffice.

In Figure 18 is shown an alternative form of extensible propeller shaft 142 which may be employed in lieu of shaft 42, best shown in Figure 4. Referring first to Figure 4, the extensible propeller shaft is shown with a square drive shaft which slidably engages a square hole. The wheel 23 is also shown in a position of adjustment relative to frame 32 such that the chisels 26 will enter the ground only a short distance. When chisels 26 are at their maximum depth, shafts 43 and 39 would be more nearly in alignment. When it is desired to disconnect the drive to the weeder rod, the wheel adjustment may be utilized for this purpose. As the frame is raised with respect to the wheel, the distance between shafts 39 and 43 increases and the square portion of propeller shaft 42 slides outwardly in its mating socket. The length of such square portions may be made such, if desired, that it will slide completely out of its mating socket when the frame is adjusted to its maximum position of elevation. The chisel plow may then be transported by towing to any place desired with the chisels 26 raised above the ground and weeder rod 56 inoperative. This, of course, eliminates wear on the weeder rod drive mechanism during periods when the machine is being transported from place to place.

In Figure 18 this construction is essentially the same as in Figure 4, except that the end 142b of shaft 142a is round rather than square. With this construction when frame 32 is elevated to its maximum position, end 142b remains in the square socket, but the square end of 142a disengages from the square socket. This permits 142a to remain connected to 142 but in unclutched position. When it is desired to reestablish the driving connection, the frame 32 is merely lowered and upon slight relative rotation of 142a with respect to 142, the square end of 142a reenters its mating socket. To facilitate such reentry, the ends of the square may be chamfered or beveled as shown at 71.

In Figures 20 and 21 another alternative rod weeder bearing structure is shown. Bracket 157 corresponds to that shown in Figures 14 and 15 and has an aperture therein of a size to permit entry of a flange of spool 58 therein, this spool being the same as shown in Figures 7 to 9. A wear plate 359, semicircular in shape, as shown in Figure 20 bears against the rear of the spool at the portion between the flanges thereof, this wear shoe being connected to a pair of legs 70 which are secured to bracket 157 by bolts 66. Legs 70, together with wear shoe 359, form a generally horseshoe shaped member with the semicircular wear shoe projecting from one face thereof. To assemble the spool structure on bracket 157, the spool and wear shoe are slid endwise on weeder rod 56, these being adapted to pass through the aperture in bracket 157. The wear shoe 359 is then moved forwardly, or to the left in Figure 20, and legs 70 secured to the bracket by bolts 66. The spool is then retained within the bracket. The apertures in legs 70 through which bolts 66 pass may be elongated, if desired, as shown by dotted lines to compensate for wear between the spool and wear shoe. Since these parts must operate without lubrication they are constructed of very hard metal to resist wear.

From the foregoing description it becomes apparent that the invention is susceptible of changes and modifications without departing from the principles thereof and it is to be understood that such changes may be resorted to without departing from the spirit and scope claimed hereinafter.

What is claimed as new is:

1. An attachment for use with a wheel supported plow of the class comprising an elongated frame supported by wheels adjacent its ends, the frame being bodily moveable substantially vertically with respect to the wheels and carrying a plurality of spaced plow members projecting rearwardly thereof, said attachment comprising; a support adapted to be affixed to the frame at one end to form an extension thereof and having a portion extending rearwardly in the direction of the plow members, a rotatable member journaled on said support, a flexible drive shaft having one end connected to said rotatable member and its other end adapted to be drivingly connected to the wheel adjacent the support, when the latter is affixed to the frame, whereby the flexible drive shaft may rotate said rotatable member from power transmitted from said wheel adjacent the support in the various positions of adjustment of the frame with respect to the wheels, journal members adapted to be attached to the plow members, a weeder rod rotatably supported by said journal members, a second rotatable member journaled on said portion extending rearwardly, a drive shaft having one end connected to said second rotatable member and its other end connected to one end of said weeder rod, and power transmission means operatively connecting said first and second rotatable members on the attachment support.

2. An attachment in accordance with claim 1 wherein said flexible drive shaft comprises an extensible member having a universal joint at each end thereof.

3. An attachment in accordance with claim 1 wherein said flexible drive shaft includes a clutch means operable to disengage the driving connection between said wheel adjacent the support and the first rotatable member when the elongated frame is raised to a predetermined position with respect to the wheels.

4. An attachment in accordance with claim 3 wherein said flexible drive shaft includes two telescopically connected parts arranged for relative rotation when extended beyond a predetermined length and provided with cooperative means for effecting conjoint rotation in positions when contracted to less than said predetermined length.

5. An attachment for use with a wheel supported plow of the class comprising an elongated frame supported by wheels adjacent its ends, the frame carrying a plurality of spaced plow chisels projecting rearwardly thereof, said attachment comprising; a support adapted to be affixed to the frame at one end to form an extension thereof and having a portion extending rearwardly in the direction of the plow chisels, a rotatable member journaled on said support, an adjustable flexible drive shaft having one end connected to said rotatable member and its other end adapted to be drivingly connected to the wheel adjacent the support, when the latter is affixed to the frame, whereby the flexible drive shaft may rotate said rotatable member from power transmitted from said wheel adjacent the support, journal members adapted to be attached to the plow chisels, a weeder rod rotatably supported by said journal members, a second rotatable member journaled on said portion extending rearwardly, an adjustable flexible drive shaft having one end connected to said second rotatable member and its other end connected to the end of said weeder rod adjacent said support, and power transmission means operatively connecting said first and second rotatable members on the attachment support.

6. An attachment in accordance with claim 5 wherein each said flexible drive shaft comprises an extensible member having a universal joint at each end thereof.

7. An attachment for use with a wheel supported plow of the class comprising an elongated frame supported by wheels adjacent its ends, the frame being bodily movable substantially vertically with respect to the wheels and carrying a plurality of spaced plow members projecting rearwardly thereof, said attachment comprising; a support adapted to be affixed to the frame at one end to form an extension thereof and having a portion extending rearwardly in the direction of the plow members, a rotatable member journaled on said support, a flexible drive shaft having one end connected to said rotatable member and its other end adapted to be drivingly connected to the wheel adjacent the support, when the latter is affixed to the frame, whereby the flexible drive shaft may rotate said rotatable member from power transmitted from said wheel adjacent the support in the various positions of adjustment of the frame with respect to the wheels, journal members adapted to be attached to the plow members, a weeder rod rotatably supported by said journal members, a second rotatable member journaled on said portion extending rearwardly, a drive shaft having one end connected to said second rotatable member and its other end connected to one end of said weeder rod, and power transmission means operatively connecting said first and second rotatable members on the attachment support, said power transmission means comprising sprockets affixed to said first and second rotatable members, and a chain trained about the sprockets drivingly connecting same.

8. An attachment for use with a wheel supported plow of the class comprising an elongated frame supported by wheels adjacent its ends, the frame being bodily movable substantially vertically with respect to the wheels and carrying a plurality of spaced plow members projecting rearwardly thereof, said attachment comprising; a support adapted to be affixed to the frame at one end to form an extension thereof and having a portion extending rearwardly in the direction of the plow members, a rotatable member journaled on said support, a flexible drive shaft having one end connected to said rotatable member and its other end adapted to be drivingly connected to the wheel adjacent the support, when the latter is affixed to the frame, whereby the flexible drive shaft may rotate said rotatable member from power transmitted from said wheel adjacent the support in the various positions of adjustment of the frame with respect to the wheels, journal members adapted to be attached to the plow members, a weeder rod rotatably supported by said journal members, a second rotatable member journaled on said portion extending rearwardly, a drive shaft having one end connected to said second rotatable member and its other end connected to one end of said weeder rod, and power transmission means operatively connecting said first and second rotatable members on the attachment support, said power transmission means comprising V-pulleys affixed to said first and second rotatable members, and a V-belt trained about the V-pulleys drivingly connecting same.

LAURENCE O. FUNDINGSLAND.

REFERENCES CITED

The following references are of record in the file of this patent:

UNITED STATES PATENTS

| Number | Name | Date |
|---|---|---|
| Re. 21,259 | Bloom | Nov. 14, 1939 |
| 796,230 | Lehman | Aug. 1, 1905 |
| 1,262,286 | Thomas | Apr. 9, 1918 |
| 1,531,526 | Thomas | Mar. 31, 1925 |
| 1,697,484 | Van Patten | Jan. 1, 1929 |
| 1,710,881 | Largent et al. | Apr. 30, 1929 |
| 2,082,163 | Jeoffroy | June 1, 1937 |
| 2,353,485 | Miller | July 11, 1944 |
| 2,355,229 | Miller | Aug. 8, 1944 |
| 2,355,950 | Calkins | Aug. 15, 1944 |